United States Patent
Tuery et al.

(10) Patent No.: US 9,163,652 B2
(45) Date of Patent: Oct. 20, 2015

(54) BLIND FASTENER EQUIPPED WITH A SELF-BREAKING HOLDING SYSTEM

(75) Inventors: Jean-Baptiste Tuery, Toulouse (FR); Clement Chirol, Trebons sur la Grasse (FR)

(73) Assignee: AIRBUS OPERATIONS (SAS), Toulouse (FR)

( * ) Notice: Subject to any disclaimer, the term of this patent is extended or adjusted under 35 U.S.C. 154(b) by 922 days.

(21) Appl. No.: 13/349,720

(22) Filed: Jan. 13, 2012

(65) Prior Publication Data

US 2012/0180279 A1    Jul. 19, 2012

(30) Foreign Application Priority Data

Jan. 13, 2011   (FR) ...................... 11 50276

(51) Int. Cl.
 *B23P 11/00*  (2006.01)
 *F16B 23/00*  (2006.01)
 *F16B 19/10*  (2006.01)
 *F16B 5/04*   (2006.01)
 *F16B 33/00*  (2006.01)

(52) U.S. Cl.
 CPC ......... *F16B 19/1072* (2013.01); *F16B 19/1054* (2013.01); *F16B 5/04* (2013.01); *F16B 33/002* (2013.01); *Y10T 29/5377* (2015.01)

(58) Field of Classification Search
 CPC .... F16B 19/1072; F16B 19/1054; F16B 5/04; F16B 33/002
 USPC .............. 29/243.53, 235, 243.5, 243.523, 58; 411/2, 43, 41
 See application file for complete search history.

(56) References Cited

U.S. PATENT DOCUMENTS

| | | | | | |
|---|---|---|---|---|---|
| 569,006 | A | * | 10/1896 | Corneau | .......................... 74/324 |
| 4,007,659 | A | * | 2/1977 | Stencel | ............................ 411/34 |
| 4,137,817 | A | * | 2/1979 | Siebol | .............................. 411/43 |
| 4,810,142 | A | * | 3/1989 | Briles | ............................. 411/43 |
| 4,877,363 | A | * | 10/1989 | Williamson et al. | ............. 411/43 |

(Continued)

FOREIGN PATENT DOCUMENTS

| | | | | |
|---|---|---|---|---|
| GB | 2344864 | * | 6/2000 | |
| GB | 2344864 | A * | 6/2000 | .......... F16B 19/1054 |

OTHER PUBLICATIONS

Huck magna-Bulb brochure (Large Blind-Side Surface Area, High-Strength Blind Bolt Design), 2007 Alcoa Fastening Systems B-AF000 0000.*

(Continued)

*Primary Examiner* — Lee D Wilson
*Assistant Examiner* — Mahdi H Nejad
(74) *Attorney, Agent, or Firm* — Young & Thompson (57) ABSTRACT

A blind attachment that includes a body (36) with—at a first end—a visible surface (38), through which a bore (40) passes that accommodates a rod (42) of which a first end (44) projects relative to the visible surface (38) and of which the other end includes a head (46) that can deform a deformation zone (48) when the rod (42) moves translationally, with the visible surface including holding elements for coupling the body (36) to a tool that is used for driving the rod (42) in rotation, whereby the holding elements include at least one lug (52) that is connected at the visible surface (38) and that projects relative to the latter, characterized in that the at least one lug (52) is connected to the body (36) by a junction zone (54) that can break when the lug undergoes a force that exceeds a given threshold.

10 Claims, 7 Drawing Sheets

(56) References Cited

U.S. PATENT DOCUMENTS

| | | | | |
|---|---|---|---|---|
| 4,907,922 | A * | 3/1990 | Jeal et al. | 411/43 |
| 4,936,725 | A * | 6/1990 | Eshraghi | 411/43 |
| 5,006,024 | A * | 4/1991 | Siebol | 411/43 |
| 5,531,552 | A * | 7/1996 | Takahashi et al. | 411/179 |
| 5,913,648 | A * | 6/1999 | Lin | 411/43 |
| 6,077,009 | A * | 6/2000 | Hazelman | 411/43 |
| 6,171,038 | B1 * | 1/2001 | Pratt et al. | 411/43 |
| 6,272,899 | B1 * | 8/2001 | Bentivogli | 72/391.8 |
| 6,537,005 | B1 * | 3/2003 | Denham | 411/42 |
| 6,665,922 | B2 * | 12/2003 | Schultz | 29/525.02 |
| 8,142,125 | B2 * | 3/2012 | Vrana et al. | 411/181 |
| 8,322,015 | B2 * | 12/2012 | Pratt et al. | 29/525.01 |
| 8,677,587 | B2 * | 3/2014 | Liu | 29/243.525 |
| 2008/0219799 | A1 * | 9/2008 | Auriol et al. | 411/43 |
| 2009/0053006 | A1 * | 2/2009 | Hufnagl et al. | 411/34 |
| 2012/0312130 | A1 * | 12/2012 | Bauer | 81/461 |
| 2015/0010370 | A1 * | 1/2015 | Pratt | 411/43 |

OTHER PUBLICATIONS

Marson™ Rivets, rivet nuts and installation tools Brochure; 2014 Alcoa Fastening Systems. All rights reserved. AFS5862C 0614 2M.*
Alcoa Magna-Loc fastening systems Brochure, 2013 Alcoa Fastening Systems. All rights reserved. AFS5526 0813 1M.*
French Search Report dated Aug. 31, 2011 from FR1150276.

* cited by examiner

BLIND FASTENER EQUIPPED WITH A SELF-BREAKING HOLDING SYSTEM

BACKGROUND OF THE INVENTION

1. Field of the Invention

This invention relates to a blind attachment equipped with a self-breaking holding system.

2. Description of the Related Art

A blind attachment makes it possible to assemble parts while having access only to a single side of the assembly.

Figures 2, 3:
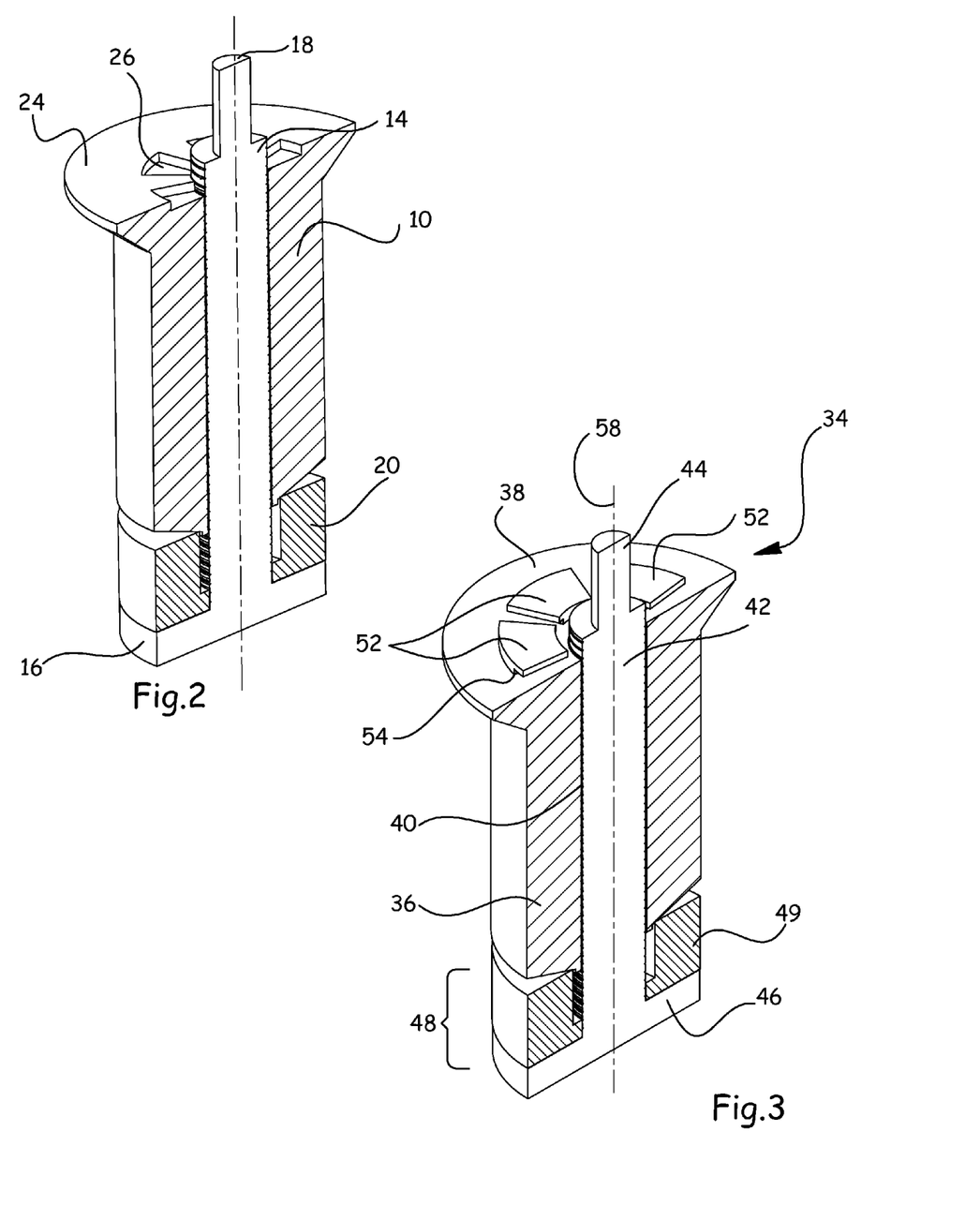
FIG. 2 is a perspective view of a blind attachment according to the prior art.
FIG. 3 is a perspective cutaway of a blind attachment according to the invention.

As illustrated in FIG. 2, a blind attachment comprises a body 10 that comprises a bore 12 in which a rod 14 is housed with a head 16 at a first end and whose other end 18 projects relative to the body 10 in such a way as to be able to be gripped by a tool. A sleeve 20 that is also called a bulb is arranged between the head 16 and the body 10.

To ensure the translational motion of the rod 14, one approach consists in providing a threaded rod 14 that is screwed into a threaded bore 12 of the body 10. The end 18 of the rod 14 comprises at least one flat surface for making it possible for a tool 22 to drive the rod 14 in rotation.

As illustrated in FIG. 2, the surface 24 of the body oriented toward the tool 22 comprises slots 26 (hollow shape) that make it possible to immobilize the body 10 in rotation so that the rotation of the rod 14 creates a relative translational motion between the rod 14 and the body 10.

According to one embodiment, a nut 28 can be interposed between the tool 22 and the surface 24 of the body.

Figure 1A:
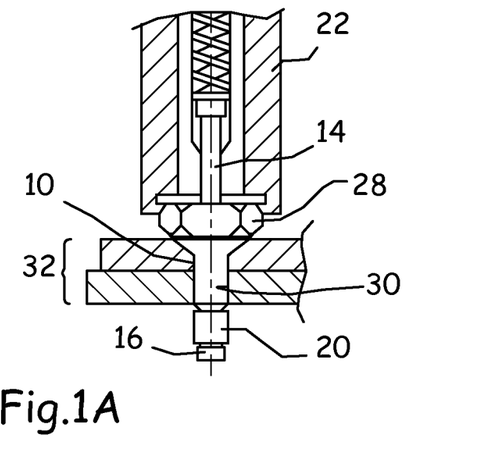
FIGS. 1A to 1D are views that illustrate the installation of an attachment according to the prior art.
Figure 1B:
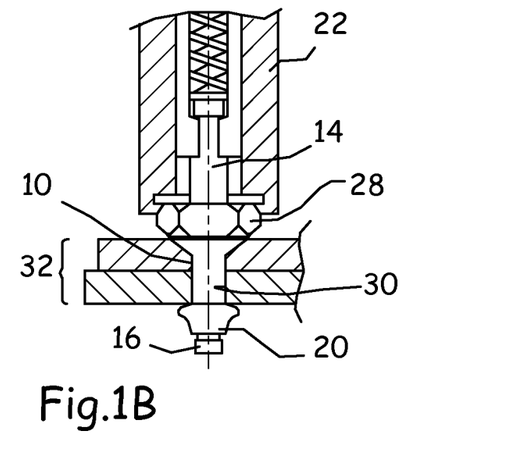
Figure 1C:
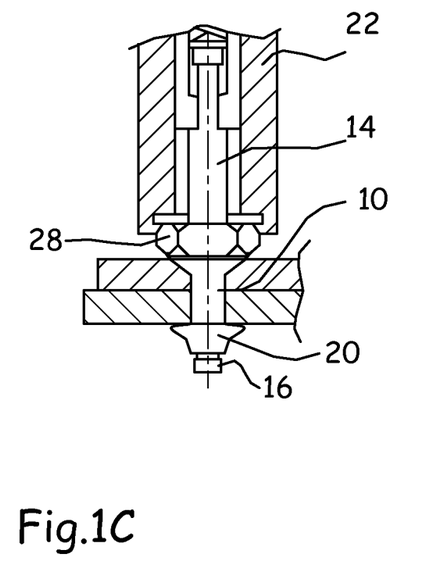
Figure 1D:
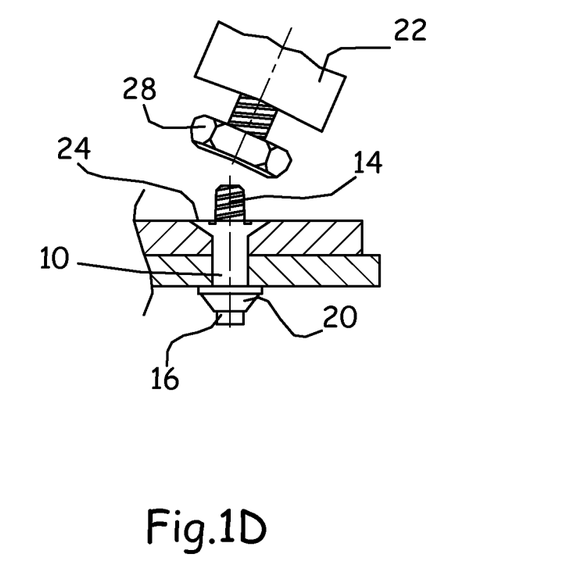

According to an operating method, in a first step, the blind attachment is put into a bore 30 made in the parts 32 to be assembled, as illustrated in FIG. 1A. When the tool 22 drives the rod 14 in rotation, this tends to deform the sleeve 20 gradually, as illustrated in FIGS. 1B and 1C, which, after creep, flattens itself against the surface that is inaccessible after the assembly. When the sleeve 20 is completely deformed, the force in the threaded rod 14 becomes too great so that the latter breaks as illustrated in FIG. 1D.

Subsequently, it is advisable to plane down the threaded rod so that the latter is flush with the surface 24 of the body.

After the installation of the blind attachment and the application of paint, the slots 26 remain visible. Consequently, this type of attachment is not entirely satisfactory in terms of esthetics.

According to another point, when these slots 26 are arranged at the surface of the fuselage, they form rough spots that create disturbances on the aerodynamic plane.

SUMMARY OF THE INVENTION

The purpose of this invention is to eliminate these drawbacks.

For this purpose, the object of this invention relates to a blind attachment that comprises a body with a visible surface at a first end, through which a bore that accommodates a rod passes and whose first end projects relative to the visible surface and whose other end comprises a head that can deform a deformation zone when the rod moves translationally, with the visible surface comprising holding means for coupling the body to a tool that is used to drive the rod in rotation, whereby said holding means comprise at least one lug that is connected to the visible surface and that projects relative to the latter, characterized in that said at least one lug is connected to the body by a junction zone that can break when the lug is subject to a force that exceeds a given threshold. After the installation of the attachment, this approach makes it possible to obtain a visible surface without recessed rough spots. Advantageously, at the junction zone, each lug comprises at least one notch that makes it possible to obtain a small cross-section and to track the rupture of the lug. According to one embodiment, for each lug, the notch is made at the base of the lug.

In addition, the invention proposes a tool for installing a blind attachment according to the invention, characterized in that it comprises a front surface, able to rest against the visible surface of the blind attachment, with at least one slot for housing a lug.

Advantageously, the tool has two directions of rotation, a first direction for causing the deformation of the blind attachment and the rupture of the rod, and a direction that is opposite to the first for causing the rupture of the lug(s).

According to one embodiment, at each slot, the tool comprises a wedge shape that can penetrate a notch of a corresponding lug.

As a variant, each slot comprises a surface that rests at a distance from the bottom of a notch that is made at the corresponding lug so as to create a moment that facilitates the rupture of the lug(s).

BRIEF DESCRIPTION OF THE DRAWING FIGURES

Other characteristics and advantages will emerge from the following description of the invention, a description that is provided only by way of example, relative to the accompanying drawings in which.

DETAILED DESCRIPTION OF THE INVENTION

As illustrated in FIG. 3, a blind attachment 34 comprises a body 36 of cylindrical shape with a tapered shape at a first end and a surface called a visible surface 38 below. This body 36 comprises a bore 40 that accommodates a rod 42 of which a first end 44 projects relative to the visible surface 38 and of which the other end comprises a head 46.

The blind attachment comprises a deformation zone 48 that can deform because of compressive forces exerted by the head 46 when the rod 42 moves translationally upward.

According to one variant, the deformation zone 48 is a sleeve 49 that is interposed between the head 46 and the body 36.

According to another variant, the deformation zone 48 is provided at the end of the body 36 that is oriented toward the head.

According to one variant, to ensure the relative translational movement between the rod 42 and the body 36, the rod 42 is threaded and screwed into the bore 40 that is tapped. In particular, a tool can impress a movement of rotation on the threaded rod 42. To do this, the end 44 of the threaded rod comprises a flat surface for making it possible to couple the threaded rod 42 to a rotary tool.

According to another variant, a tool can pull on the end 44 of the threaded rod so that the latter moves translationally.

Figure 5:
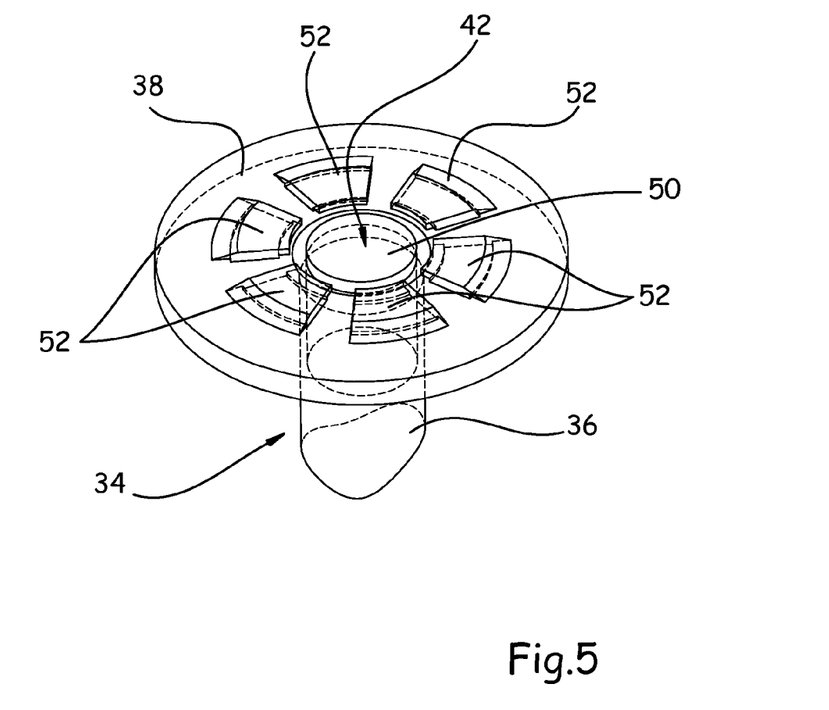
FIG. 5 is a perspective view of the upper part of a blind attachment according to the invention after the rupture of the rod.

The rod 42 comprises a rupture initiator that makes it possible to cut it into sections in a plane that is flush with the visible surface 38 when the deformation zone is deformed in a suitable manner. According to one embodiment, the rod 42 comprises a notch at the rupture plane 50 that is visible in FIG. 5.

According to the different variants, the visible surface 38 comprises holding means for coupling the body 36 to a tool, provided either for immobilizing the blind attachment in rotation, in particular when the threaded rod 42 is put into rotation for deforming the deformation zone 48, or for subjecting a torque to the blind attachment, in particular after the rod 42 is broken to verify the good tightening of the attachment.

According to the invention, the holding means comprise at least one lug 52 that is connected at the visible surface 38 and that projects relative to the latter. The lug 52 is connected to the body 36 by a junction zone 54 that can break when the lug undergoes a force that exceeds a given threshold, called a lug rupture threshold, which is less than the mechanical strength of the blind attachment so as not to damage it.

Figure 4:
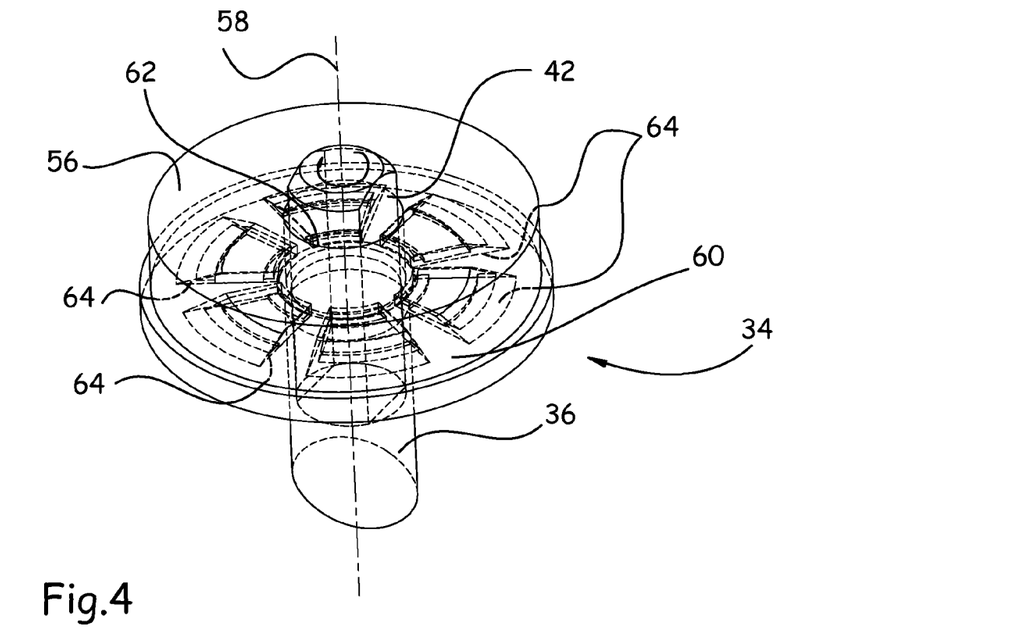
FIG. 4 is a perspective view of the upper part of a blind attachment according to the invention during its deformation, with the part of the tool being illustrated in transparency.

In addition, as illustrated in FIG. 4, a tool 56 (of which only one part is illustrated) is provided for putting the rod 42 in rotation along its longitudinal axis 58 and comprises a frontal surface 60, able to rest against the visible surface 38 with an opening 62 for making it possible for the rod 42 to pass, and at least one slot 64 for housing the lug 52.

Advantageously, the blind attachment comprises several lugs 52 for distributing the forces and for ensuring that the body is held during the deformation of the zone 48 and the cross-section of the rod 42.

In addition, the tool 56 comprises a number of slots 64 that is at least equal to that of the lugs 52, with the slots 64 being arranged at the frontal surface 60 in a manner that is suitable for housing the lugs 52.

For each lug, the junction 54 between the lug 52 and the body 36 is sized in such a way as to break when the force exerted by the tool reaches the lug rupture threshold.

Figure 6:
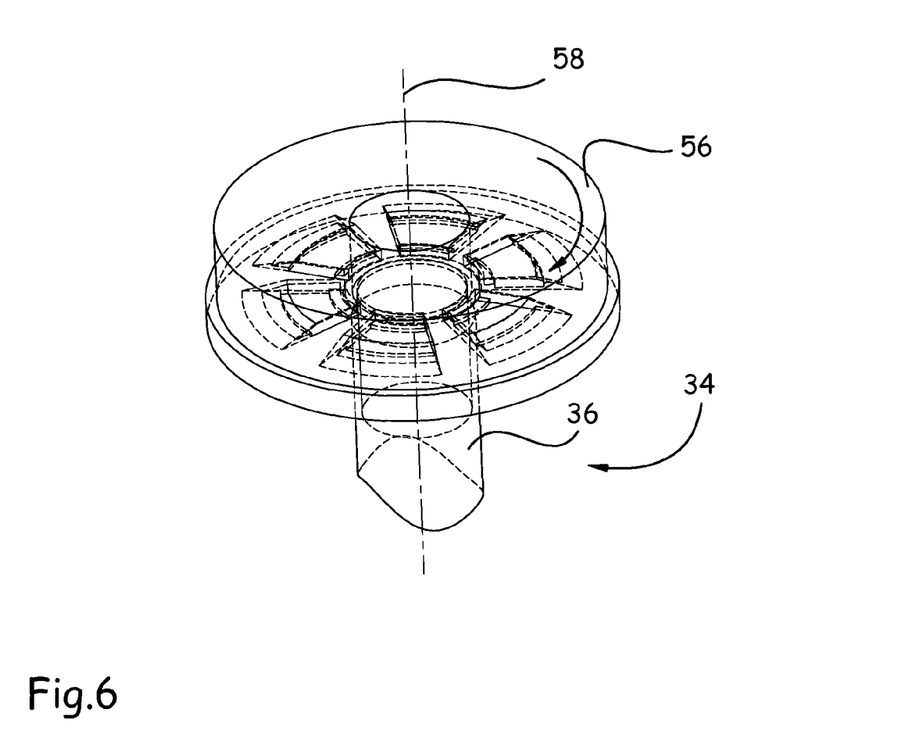
FIG. 6 is a perspective view of the upper part of a blind attachment according to the invention during the rupture of the holding means, with the part of the tool being illustrated in transparency.

Thus, as illustrated in FIG. 6, when the tool 56 pivots around the longitudinal axis 58 and it exerts a force that reaches the lug rupture threshold, it causes the rupture of the lugs 52 that are cut into sections at the junction zone 54.

Figure 7:
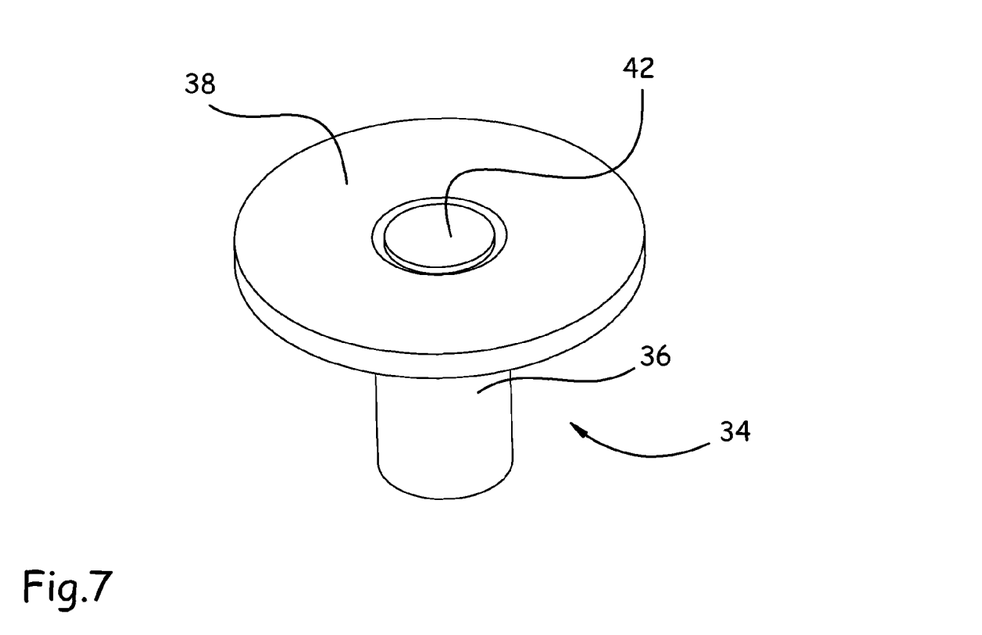
FIG. 7 is a perspective view of the upper part of a blind attachment according to the invention at the end of the installation process.

Advantageously, the lugs 52 are cut into sections at the plane of the visible surface 38. Thus, after its installation, the blind attachment does not need to be planed down and has a flat surface as illustrated in FIG. 7.

For this purpose, each lug 52 comprises—at the junction zone 54—at least one notch 66 that makes it possible to obtain a small cross-section and to track the rupture of the lug at the plane of the visible surface 38.

For each lug, the notch 66 is made at the base of the lug, from the side where the force of the tool is applied to cut the lug into sections.

The notch 66 can have different shapes as illustrated in FIGS. 8A to 8D.

Figure 8A:
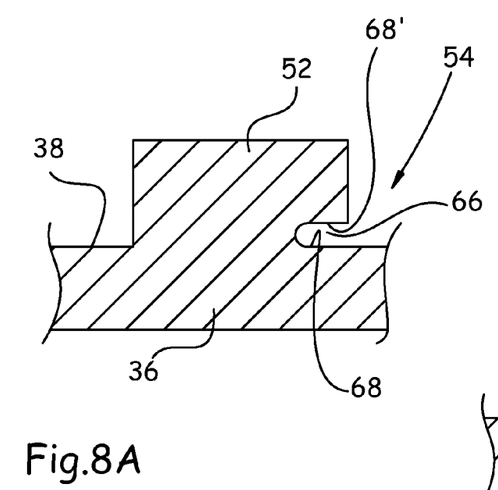
FIGS. 8A to 8D are cutaways that illustrate different variants of lugs.
Figure 8B:
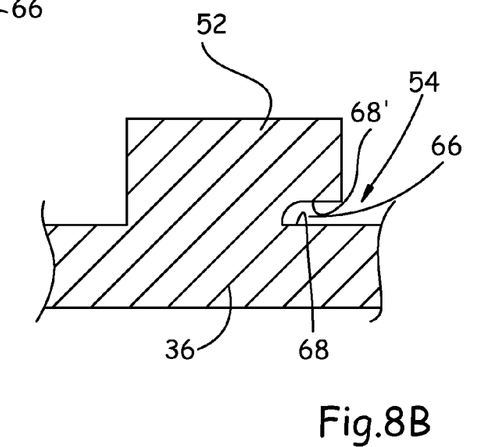

According to one embodiment, for at least one lug, the notch 66 is delimited by two parallel surfaces 68, 68', one of the two surfaces 68 being arranged in the plane of the visible surface 38, as illustrated in FIGS. 8A and 8B. According to a variant that is illustrated in FIG. 8A, the bottom of the notch 66 has a rounded shape. According to another variant that is illustrated in FIG. 8B, the bottom of the notch 66 has a quarter round shape.

Figure 8C:
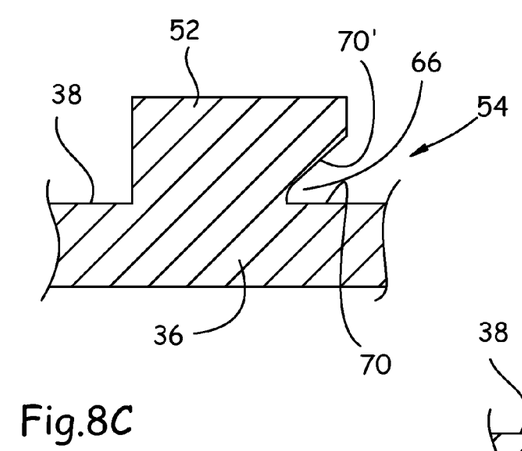
Figure 8D:
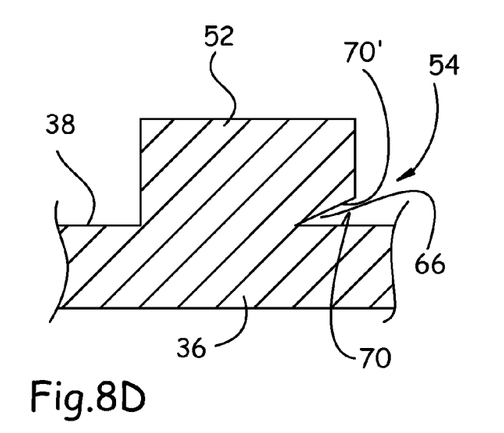

According to an embodiment that is illustrated in FIGS. 8C and 8D for at least one lug, the notch 66 has a triangular cross-section with a surface 70 that is arranged in the plane of the visible surface 38 and another surface 70' that makes an angle that is less than or equal to 60°. According to a variant that is illustrated in FIG. 8C, the surface 70' makes an angle on the order of 45° with the surface 70. According to another variant that is illustrated in FIG. 8D, the surface 70' makes an angle on the order of 30° with the surface 70. The intersection between the two surfaces 70, 70' can be rounded as illustrated in FIG. 8C or not rounded as illustrated in FIG. 8D.

According to a first operating mode, the relative rotational movement between the visible surface 38 of the body and the frontal surface 60 of the tool 56 that is necessary for breaking the lugs 52 has the same direction as the one that is necessary for causing the deformation of the blind attachment and the rupture of the threaded rod 42.

In this case, the lug rupture threshold is greater than the force that is necessary for cutting the rod 42 into sections, which is itself greater than the one that is necessary for deforming the deformation zone 48 completely.

According to another operating mode, the tool has two directions of rotation. Thus, the relative rotational movement between the visible surface 38 of the body and the frontal surface 60 of the tool 56 that is necessary for breaking the lugs 52 has a direction that is opposite to the one that is necessary for causing the deformation of the blind attachment and the rupture of the rod 42.

Each lug 52 has two surfaces 72, 72' that are arranged in two essentially radial planes, one of them 72' having a notch 66 at its base. In parallel, each slot 64 of the tool 56 comprises two surfaces 74, 74' that are arranged in two essentially radial planes, with a first surface 74 being able to rest against the surface 72 of the lug for immobilizing the body 36 in rotation during its rotating of the rod 42, as illustrated in FIG. 9A, with the other surface 74' being able to rest against the surface 72' of the lug for breaking it, as illustrated in FIG. 9B.

This reversal of direction makes it possible to create an operation that is clearer for the operator, who can distinguish between the two installation phases, namely the deformation phase of the deformation zone to the rupture of the rod 42 and then the rupture phase of the lugs. This reversal of direction also makes it possible to verify the good mechanical hold of the deformation zone and that the blind attachment is prestressed well.

Figure 9A:
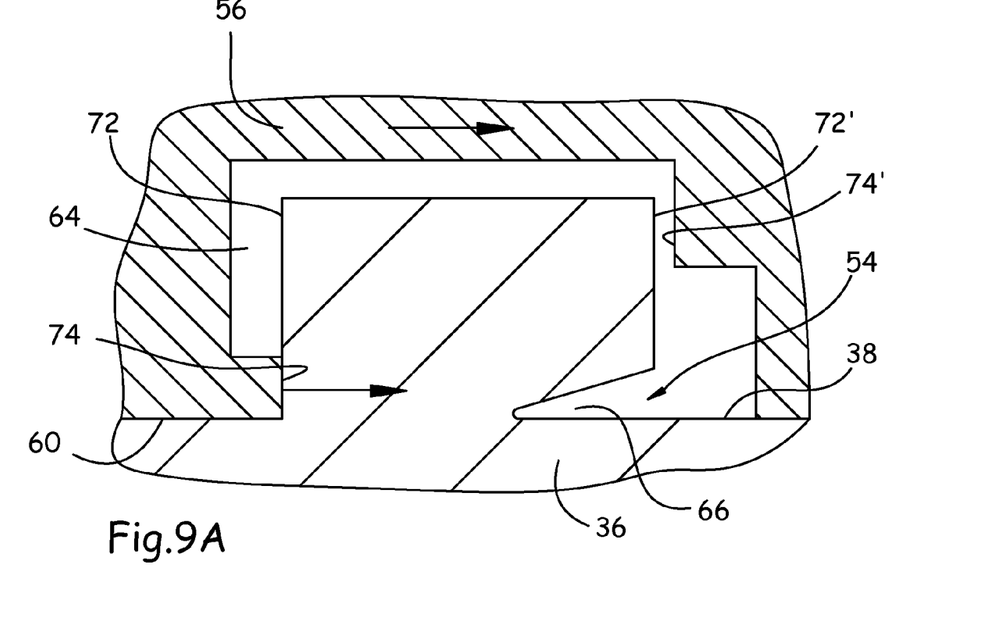
FIGS. 9A and 9B are cutaways that illustrate the action of a tool on a blind attachment according to the invention respectively during the two installation phases for a first form of lugs.
Figure 9B:
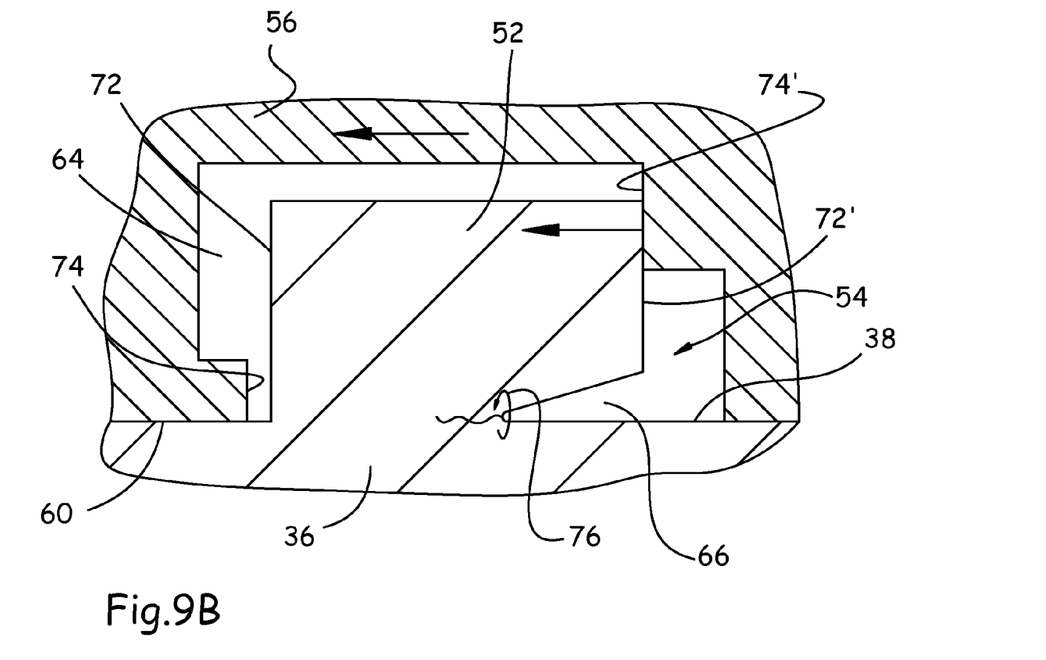

Advantageously, in the first direction of rotation, the tool is in contact with the base of each lug, as illustrated in FIG. 9A. This makes it possible not to create heavy stresses. In the opposite direction, force is applied at a distance from the bottom of the notch 66, which tends to create a moment 76 that facilitates the rupture of the lug as illustrated in FIG. 9B.

Figure 10A:
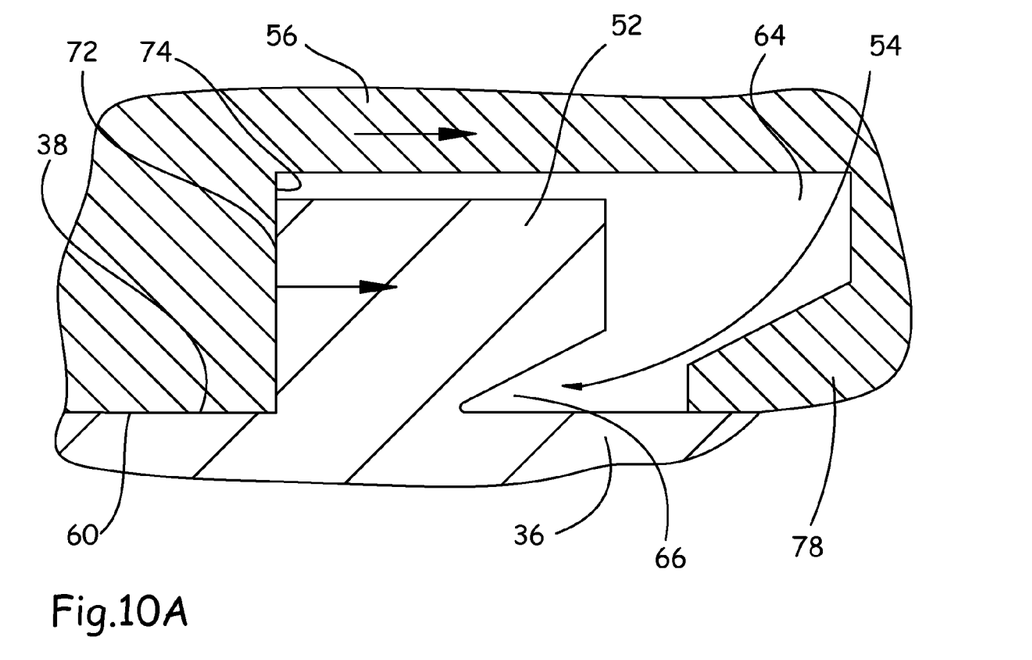
FIGS. 10A and 10B are cutaways that illustrate the action of a tool on a blind attachment according to the invention respectively during the two installation phases for a second form of lugs.
Figure 10B:
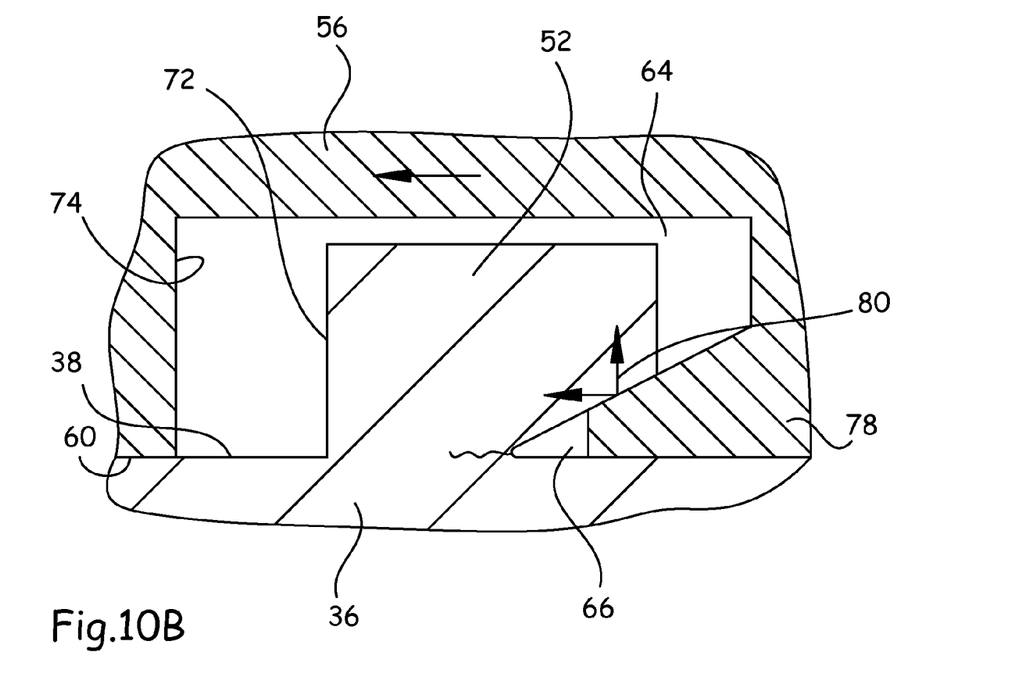

According to another variant that is illustrated in FIGS. 10A and 10B, the tool 56 comprises—at each slot 64—a wedge shape 78 that can penetrate the notch 66 of the corresponding lug 52. As illustrated in FIG. 10B, this arrangement makes it possible to create a vertical force 80 on the lug that tends to facilitate the rupture of the lug 52.

The invention claimed is:

1. A blind attachment, comprising:
    a body with—at a first end—a visible surface;
    a bore that passes through the body and the first end;
    a rod passing through the bore; of which
    a first end of the rod projects relative to the visible surface;
    a second end of the rod comprises a head that can deform a deformation zone when the rod moves translationally;
    a holder configured for coupling the body to a tool that is used for driving the rod in rotation, whereby said holder comprises at least one lug that is connected at the visible surface and that projects relative to the visible surface, at least one notch is formed at a base of the at least one lug, the at least one notch is made on one surface of the at least one lug at which the tool for cutting the at least one lug into sections can rest, the at least one notch comprising a surface that is arranged in a plane of the visible surface, wherein said at least one notch is in-between the visible surface and below a top surface of said at least one lug; and
    a junction zone that can break when the at least one lug undergoes a force that exceeds a given treshhold.

2. The blind attachment according to claim 1, wherein the at least one notch makes the at least one lug possible to obtain a small cross-section and to track a rupture of the at least one lug.

3. The blind attachment according to claim 1, wherein for the at least one lug, the at least one notch has the triangular cross-section with the surface that is arranged in the plane of the visible surface and another surface that makes an angle that is less than or equal to 60°.

4. The blind attachment according to claim 1, wherein for the at least one lug, the at least one notch is delimited by two parallel surfaces, with one of the two parallel surfaces being arranged in the plane of the visible surface.

5. The tool for installing the blind attachment according to claim 1, comprising:
    a coupler configured to couple the rod and a frontal surface, able to rest against the visible surface of the blind attachment, with at least one slot for housing the at least one lug.

6. The tool according to claim 5, wherein the tool has two directions of rotation, a first direction for causing the deformation of the blind attachment and the rupture of the rod and a reverse direction for causing the rupture of the at least one lug.

7. The tool according to claim 5, wherein the tool comprises—at the at least one slot—a wedge shape that can penetrate the at least one notch of the corresponding at least one lug.

8. The tool according to claim 5, wherein the at least one slot comprises a surface that rests at a distance from a bottom of the at least one notch that is made at the level of the corresponding at least one lug in such a way as to create a moment that facilitates the rupture of the at least one lug.

9. The tool according to claim 6, further comprising at the at least one slot a wedge shape that can penetrate the at least one notch of the corresponding at least one lug.

10. The tool according to claim 6, wherein the at least one slot comprises a surface that rests at a distance from the bottom of the at least one notch that is made at a level of the corresponding at least one lug in such a way as to create a moment that facilitates the rupture of the at least one lug.

\* \* \* \* \*